United States Patent
Gehlen et al.

[11] 3,720,980
[45] March 20, 1973

[54] PRESSING MACHINE FOR FORMING ELONGATED BODIES OF MEAT AND THE LIKE EDIBLE MATERIAL

[75] Inventors: Hermann Walter Gehlen, Kaiserslautern, Upper Platine; Karl Hartmann, Bremerhaven-Speckenbuttel; Gerhard Thieme, Kaiserslautern, Upper Palatine, all of Germany

[73] Assignee: Eisenwerke Kaiserslautern GmbH, Kaiserslautern/Pfalz, Germany

[22] Filed: Aug. 10, 1970

[21] Appl. No.: 62,454

[30] Foreign Application Priority Data

Aug. 9, 1969 Germany...................P 19 40 724.1

[52] U.S. Cl. ......................17/32, 425/242, 425/246
[51] Int. Cl. ...............................................A22c 7/00
[58] Field of Search ...............17/32; 31/7, 8, 10, 14; 18/2 RP, 2 RM, 16 E, 22, 30 PT, 30 QD, 30 QM, 30 QP

[56] References Cited

UNITED STATES PATENTS

| | | | |
|---|---|---|---|
| 585,811 | 7/1897 | Ballam | 31/8 |
| 994,714 | 6/1911 | Boyle | 17/32 |
| 1,171,937 | 2/1916 | Fisher | 17/32 |
| 1,731,006 | 10/1929 | Goodwin et al | 18/30 PT |
| 2,471,703 | 5/1949 | Rapp et al. | 31/8 |

FOREIGN PATENTS OR APPLICATIONS 1,299,087   6/1962   France .................................17/32

*Primary Examiner*—Lucie H. Laudenslager
*Attorney*—Greene & Durr

[57] ABSTRACT

A pressing machine for forming elongated bodies or portions of meat and the like edible material comprises an extrusion plate forming a wall of a compression chamber and being provided with at least one array of calibrated extrusion openings the cross-section of which corresponds to the cross-section of the bodies to be formed. A forming plate, having a thickness equal to the length of the bodies and being slidably mounted between the extrusion plate and a stationary guide plate, is provided with through-going passages of equal cross-section to and aligned with, in its operative position, the openings of the extrusion plate. Upon filling of the passages with compressed material extruded through said openings, the forming plate is displaced to a retracted position for the ejection of the bodies formed from said passages.

5 Claims, 4 Drawing Figures

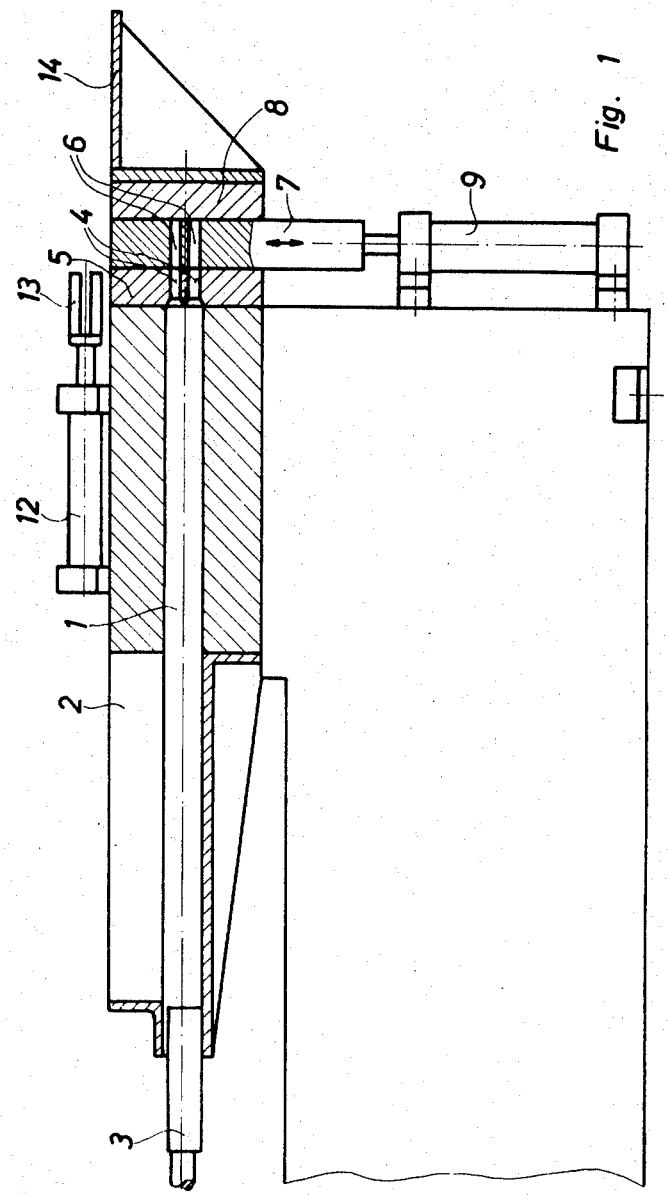

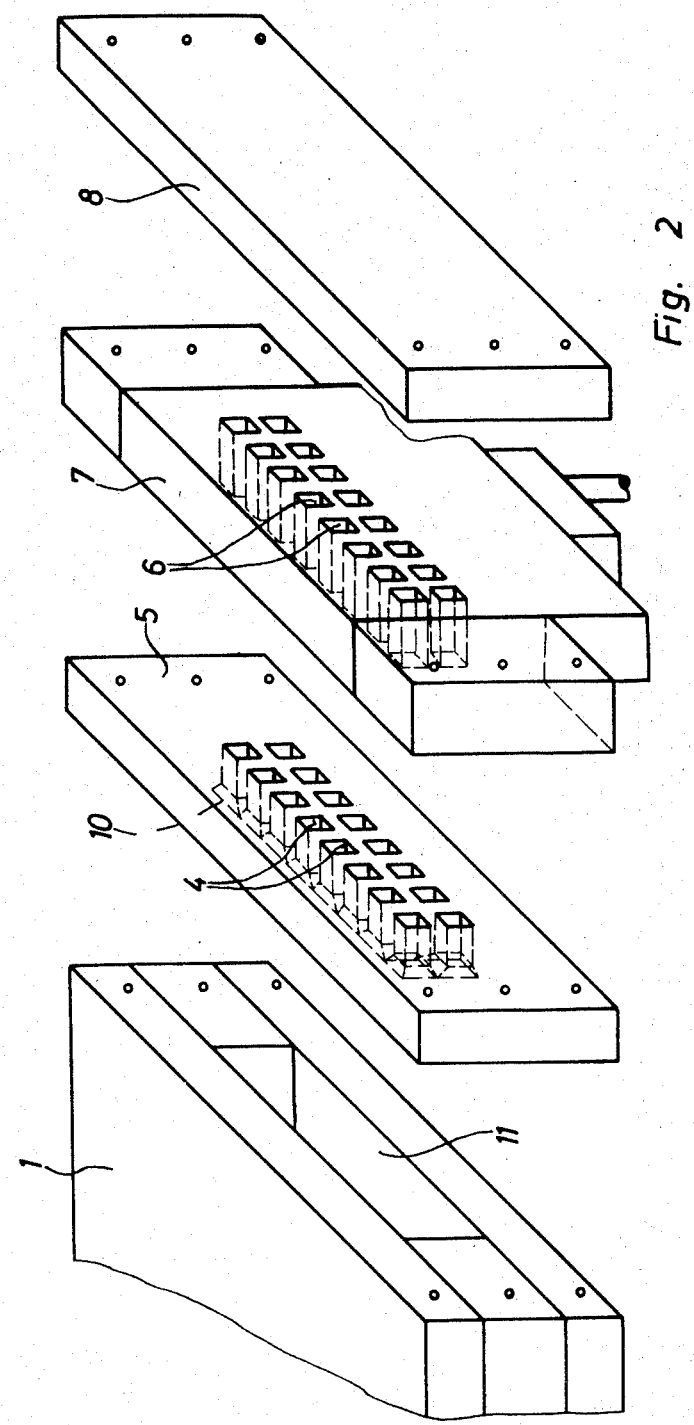

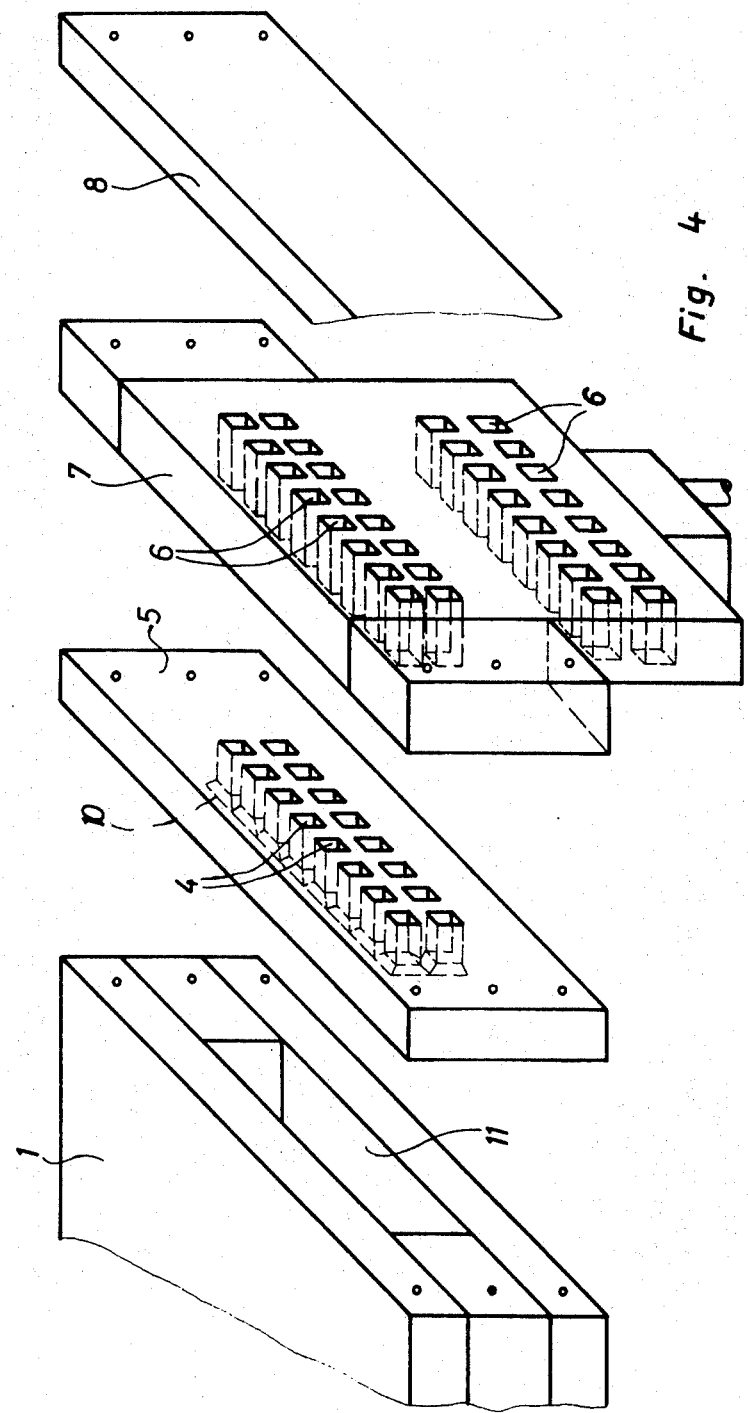

PRESSING MACHINE FOR FORMING ELONGATED BODIES OF MEAT AND THE LIKE EDIBLE MATERIAL

The present invention relates to a machine for the production and portioning of elongated bodies of meat and the like edible material by extruding the material under pressure through an extrusion plate provided with a plurality of calibrated extrusion openings. More particularly, the invention is concerned with the production of so-called fish fingers or croquettes in the form of elongated bodies of filleted and preferably frozen fish meat having a constant size and weight, say 20 grams each, though by no means limited thereto.

In the production of bodies or portions of meat, fish, vegetables and the like edible material, it is customary to extrude and divide or portion the material into constant lengths. For this purpose, it has already been proposed to provide, at a point ahead of the exit of a pressing and extrusion chamber, two sets of cutting plates or knives one disposed behind the other, each of said sets being mounted in a suitable frame and having cutting edges pointing in a direction opposite to the extrusion direction of the material. The knives supported by one of the frames are parallel and disposed horizontally and the knives supported by the other frame are parallel and disposed vertically or at right angle to the knives of the first set or frame.

An extrusion device of the foregoing type is equivalent to a perforate extrusion plate by subdividing the initially extruded body into a number of elongated units or bodies having a reduced cross-section, to be subsequently cut into appropriate lengths or sizes. In the use of a machine of this type, it has become impossible to avoid variations of the feeding or extrusion speeds of the individual units or bodies of reduced cross-section, whereby to result in final units or portions having a length and weight varying within relatively wide limits, aside from other drawbacks.

Accordingly, an important object of the present invention is the provision of an improved pressing and portioning machine of the referred to general type by which the formation of substantially equal bodies or portions, both as to weight and shape, of meat and the like edible material is ensured.

A more specific object of the invention is the provision of a machine of this type for the production of elongated bodies or portions of meat or the like material characterized by a substantially constant length and cross-section of the bodies formed.

Yet another object of the invention is the provision of an extrusion and portioning machine of the referred to type which is both simple in construction, as well as efficient and economical in operation.

The invention, both as to the foregoing and ancillary objects as well as novel aspects thereof, will be better understood from the following detailed description of a preferred practical embodiment, taken in conjunction with the accompanying drawings forming part of this specification and in which:

FIG. 1 shows, partly in elevation and partly in section, a machine for compressing and portioning meat and the like edible material, constructed in accordance with the principles of the invention;

FIG. 2 is an "exploded" perspective view, more clearly showing the essential parts of the machine according to FIG. 1; and FIGS. 3 and 4 are views similar respectively to FIGS. 1 and 2 and showing a modification of the machine according to the invention.

Like reference numerals denote like parts in the different views of the drawings.

Figure 3:
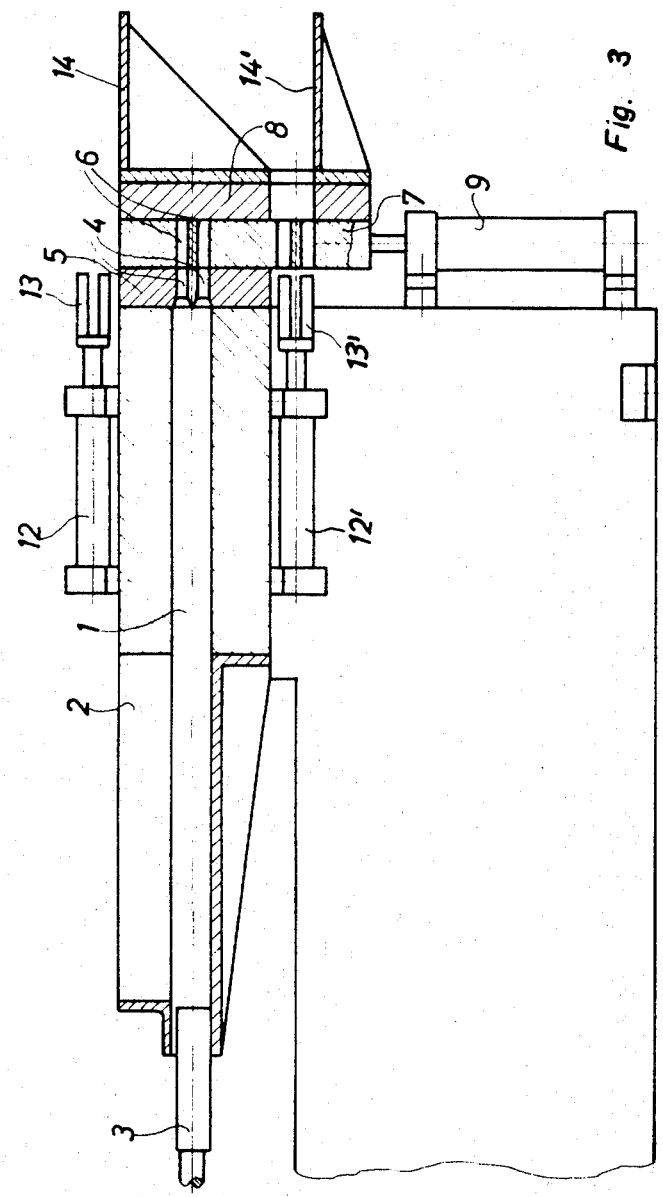

With the foregoing objects in view, the invention involves generally the provision of an extrusion plate having a plurality of extrusion openings and forming a wall of a compression chamber into which is introduced the material to be extruded and pressed against said plate by a piston or equivalent pressure-applying means. Disposed in spaced relation and parallel to the outer surface of the extrusion plate is a fixed retaining or guide plate and a forming or portioning plate is slidably supported, between an operative and a retracted position, between said extrusion and guide plates. The forming plate is provided with through-going transverse passages equal in number and cross-section to the openings of the extrusion plate, said passages being aligned with said openings in the operative position of said forming plate. As a consequence, the passages of the forming plate of constant length and cross-section are filled with extruded material under uniform pressure, whereby to result in bodies or portions of substantially equal length, cross-section and weight which may be ejected in the retracted position of the plate by the aid of suitable ejecting or discharge means, in a manner as will become more apparent as the description proceeds.

While a machine according to the invention has been found suitable principally for the production of bodies or portions of any type of edible material, it is especially applicable to the production or portioning of deep-frozen foods, in particular filleted fish and other meat, to produce what are generally known as fish fingers, croquettes or meat cakes in the trade, by deep-frozen being understood a temperature imparting to the foods an adequate dimensional stability as well as the possibility of prolonged storage, that is, comprising practically a temperature range from about $-10°$ to $-30°C$.

The discharge of the bodies from the forming plate is advantageously effected by means of hydraulically operated plungers or pistons synchronized in a known manner with the operating rhythm of the machine, in a manner well known and as will become apparent as the description proceeds in reference to the drawings.

Referring first to FIGS. 1 and 2, the pressing and forming machine shown comprises a flat rectangular pressure chamber 1 supported by a suitable base or frame which may house the hydraulic and other auxiliary operating devices for the control of the forming and ejecting operations. The pressure chamber 1 is preceded by a feeding shaft or space 2 into which is introduced the material to be extruded. A pressure piston 3 serves, in the example shown, to feed the material in the space 2 to the chamber 1 and to press the same against an extrusion plate 5 forming one of the short end walls of the chamber and being provided, in the example shown, with two parallel arrays of calibrated extrusion openings 4.

Slidably disposed, at right angle to the extrusion direction, between the plate 5 and a parallel stationary guide or retaining plate 8 is the forming or portioning plate proper 7 which is provided with transverse through-going passages 6 having a cross-section substantially equal to the cross-section of the extrusion openings 4 of plate 5 and being aligned with the latter in the operative position of plate 7, as shown in FIG. 1. As a consequence, both the length and cross-section of bodies formed is determined by the thickness of the plate 7 and cross-section of the passages 6, whereby to result in the formation of bodies or portions of substantially equal shape and size as well as weight in the passages 6. Plate 7 is then displaced, as indicated by the double arrow in the drawing, from the operative position shown to a retracted position by any suitable means, such as a hydraulic cylinder or actuator 9 shown by way of illustration, whereupon the bodies formed are ejected upon a receiving platform 14 by a multiple-piston discharge device 13 also advantageously operated by a hydraulic actuator 12 in proper time sequence or synchronism with the hydraulic actuator 9. Plate 7 is then returned to its operative position for the commencement of a new forming cycle or operation.

The ingress edges of the extrusion openings 4 are advantageously of an outwardly flaring shape as shown at 10, FIG. 2, to facilitate the introduction and extrusion of the material.

As can be seen from the foregoing, the retractable forming plate 7 according to the invention performs the three-fold function of receiving, portioning and discharging the material, whereby to result in a simplification of both the construction and operation of the machine.

FIGS. 3 and 4 show a modification of the machine according to FIGS. 1 and 2 for the doubling of the output. To this end, the forming plate 7 is provided with two spaced sets of arrays of passages 6 and the plate is operated by the hydraulic cylinder 9 to alternately place one of said sets of passages in alignment with the extrusion openings 4 of the plate 5. A pair of ejecting devices 13 and 13', disposed above and below the chamber 1 and operated alternately by actuators 12 and 12' in proper time relation to the operation of the cylinder 9, enable the filling of one set of passages and simultaneously ejection of the bodies formed in the other set upon receiving platforms 14 and 14', respectively, and vice versa, in the manner readily understood.

While the extrusion openings 4 and the forming passages 6 are shown in the drawing to be of equal cross-sectional (rectangular) dimension, their cross-sections may differ within limits, it being essential only for the passages 6 to have a desired cross-section, to result in the bodies being formed having a desired shape or configuration.

In the foregoing, the invention has been described in reference to a specific exemplary device or embodiment. It will be evident, however, that variations and modifications, as well as the substitution of equivalent parts and elements for those shown herein for illustration, may be made without departing from the broader scope and spirit of the invention.

We claim:

1. A pressing machine for forming elongated bodies of meat and like edible material especially from deep-frozen filleted fish and other meat, comprising
   1. a compression chamber of substantially rectangular cross-sectional shape positioned with a substantially horizontal axis,
   2. an extrusion plate forming one end wall of the chamber and provided with a plurality of relatively long extrusion openings, in the extrusion direction each of which is of the approximate cross-sectional shape of the elongated bodies to be produced, the ingress edges of the extrusion openings flaring outwardly in the direction of the chamber to facilitate the extrusion of said meat and like edible material,
   3. horizontally movable pressure applying means to extrude material introduced into said chamber through the openings in said extrusion plate,
   4. a stationary guide plate parallel to and spaced from said extrusion plate,
   5. a forming plate slidably mounted between said extrusion plate and said guide plate, said forming plate having a thickness equal to the length of the bodies to be formed and provided with a plurality of through-going transverse forming passages equal in number to and mutually spaced like the openings of said extrusion plate, and
   6. means to operate said forming plate between and operative position with said passages in alignment with the corresponding openings of said extrusion plate, for the filling of said passages with extruded material, and a retracted position with said passages presenting free open ends, for the ejection of the bodies formed therein.

2. A pressing and forming machine as claimed in claim 1, wherein said pressure applying means comprises a pressure piston slidable in the chamber in a horizontal direction towards and away from said extrusion plate, and wherein said chamber opposite the extrusion plate end comprises a feed space opening.

3. A pressing and forming machine as claimed in claim 1, including discharge means mounted adjacent one of the external horizontal surfaces of said chamber comprising a plurality of pistons for ejecting the bodies formed in said passages in the retracted position of said forming plate.

4. A pressing and forming machine as claimed in claim 1, including discharge means disposed at one side of said forming plate and adjacent one of the external horizontal surfaces of said chamber and comprising a plurality of pistons for ejecting the bodies formed in said passages in the retracted position of said forming plate, and a platform connected to said guide plate for receiving the bodies ejected by said pistons.

5. A pressing and forming machine as claimed in claim 1, wherein said forming plate is provided with two identical and spaced sets of passages alternately operable into alignment with the openings of said extrusion plate by displacement of said forming plate in opposite directions, and a pair of discharge means disposed respectively above and below said chamber, to allow of filling of one set of passages and simultaneous discharge of the contents of the other set, and vice versa.

* * * * *